(12) United States Patent
Lo

(10) Patent No.: US 6,459,740 B1
(45) Date of Patent: Oct. 1, 2002

(54) MAXIMUM RATIO TRANSMISSION

(75) Inventor: Titus Lo, Redmond, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/156,066

(22) Filed: Sep. 17, 1998

(51) Int. Cl.$^7$ .............................................. H04L 27/00
(52) U.S. Cl. ........................................ 375/259; 375/347
(58) Field of Search ................................. 375/259, 347

(56) References Cited

U.S. PATENT DOCUMENTS

| | | | |
|---|---|---|---|
| 3,633,107 A | * 1/1972 | Brady | 375/267 |
| 5,369,412 A | * 11/1994 | Tsujimoto | 342/380 |
| 5,487,091 A | * 1/1996 | Jasper et al. | 375/347 |
| 5,819,168 A | * 10/1998 | Golden et al. | 455/303 |
| 5,819,169 A | * 10/1998 | Fudem | |
| 5,949,833 A | * 9/1999 | Weerackody | 375/347 |
| 5,966,095 A | * 10/1999 | Hiramatsu et al. | 342/383 |
| 6,052,085 A | * 4/2000 | Hanson et al. | 342/373 |
| 6,088,408 A | * 7/2000 | Calderbank et al. | 375/347 |

OTHER PUBLICATIONS

A. Wittneben, Basestation modulation diversity for digital simulcast, IEEE 1991, pp. 848–853.*
A. Wittneben, A New Bandwidth Efficient Transmit Antenna Modulation Diversity Schem for Linear Digital Modulation, IEEE 1993, pp. 1630–1634.*
A. Wittneben, "Basestation modulation diversity for digital SIMULCAST," 41$^{st}$ IEEE Vehicular Technology Conference, May 19–22, 1991, St. Louis, Mo.*

(List continued on next page.)

*Primary Examiner*—Chi Pham
*Assistant Examiner*—Tony Al-Beshrawi
(74) *Attorney, Agent, or Firm*—Perkins Coie LLP

(57) ABSTRACT

An arrangement where a transmitter has a plurality of transmitting antennas that concurrently transmit the same symbol, and where the signal delivered to each transmitting antenna is weighted by a factor that is related to the channel transmission coefficients found between the transmitting antenna and receiving antennas. In the case of a plurality of transmit antennas and one receive antenna, where the channel coefficient between the receive antenna and a transmit antenna i is $h_i$, the weighting factor is $h_i^*$ divided by a normalizing factor, a, which is $$\left( \sum_{k=1}^{K} |h_k|^2 \right)^{1/2},$$

where K is the number of transmitting antennas. When more than one receiving antenna is employed, the weighting factor is $\frac{1}{a}(gH)^H$, where $g=[g_1 \ldots g_L]$, H is a matrix of channel coefficients, and a is a normalizing factor $$\left( \sum_{p=1}^{L} \sum_{q=1}^{L} \left| \sum_{k=1}^{K} h_{pk} h_{qk}^* \right| \right)^{1/2}.$$

4 Claims, 1 Drawing Sheet

OTHER PUBLICATIONS

N. Seshadri and Jack H. Winters, "Two Signaling Schemes for Improving the Error Performance for Frequency–Division–Duplex (FDD) Transmission Systems Using Transmitter Antenna Diversity," 43$^{rd}$ IEEE Vehicular Technology Conference, May 18–20, 1993, Secaucus, NJ.*

Armin Wittneben, "A New Bandwidth Efficient Transmit Antenna Modulation Diversity Scheme for Linear Digital Modulation," IEEE International Conference on Communications, May 23–26, 1993, Geneva, Switzerland.*

Jack J. Winters, "The Diversity Gain of Transmit Diversity in Wireless Systems with Rayleigh Fading," IEEE International Conference on Communications, May 1–5, 1994, New Orleans, Louisiana.*

Alamouti, Siavash M. "A Simple Transmit Diversity Technique for Wireless Communications," IEEE Journal on Select Areas in Communications, vol. 16, No. 8, Oct. 1998, pp. 1451–1458.*

* cited by examiner

MAXIMUM RATIO TRANSMISSION

BACKGROUND OF THE INVENTION

Wireless communications services are provided in different forms. For example, in satellite mobile communications, communications links are provided by satellite to mobile users. In land mobile communications, communications channels are provided by base stations to the mobile users. In PCS, communications are carried out in microcell or picocell environments, including outdoors and indoors. Regardless the forms they are in, wireless telecommunication services are provided through radio links, where information such as voice and data is transmitted via modulated electromagnetic waves. That is, regardless of their forms, all wireless communications services are subjected to vagaries of the propagation environments.

The most adverse propagation effect from which wireless communications systems suffer is the multipath fading. Multipath fading, which is usually caused by the destructive superposition of multipath signals reflected from various types of objects in the propagation environments, creates errors in digital transmission. One of the common methods used by wireless communications engineers to combat multipath fading is the antenna diversity technique, where two or more antennas at the receiver and/or transmitter are so separated in space or polarization that their fading envelopes are de-correlated. If the probability of the signal at one antenna being below a certain level is p (the outage probability), then the probability of the signals from L identical antennas all being below that level is $p^L$. Thus, since p<1, combining the signals from several antennas reduces the outage probability of the system. The essential condition for antenna diversity schemes to be effective is that sufficient de-correlation of the fading envelopes be attained.

A classical combining technique is the maximum-ratio combining (MRC) where the signals from received antenna elements are weighted such that the signal-to-noise ratio (SNR) of their sum is maximized. The MRC technique has been shown to be optimum if diversity branch signals are mutually uncorrelated and follow a Rayleigh distribution. However, the MRC technique has so far been used exclusively for receiving applications. As there are more and more emerging wireless services, more and more applications may require diversity at the transmitter or at both transmitter and receiver to combat severe fading effects. As a result, the interest in transmit diversity has gradually been intensified. Various transmit diversity techniques have been proposed but these transmit diversity techniques were built on objectives other than to maximize the SNR. Consequently, they are sub-optimum in terms of SNR performance.

SUMMARY

Improved performance is achieved with an arrangement where the transmitter has a plurality of transmitting antennas that concurrently transmit the same symbol, and where the signal delivered to each transmitting antenna is weighted by a factor that is related to the channel transmission coefficients found between the transmitting antenna and receiving antenna(s). In the case of a plurality of transmit antennas and one receive antenna, where the channel coefficient between the receive antenna and a transmit antenna i is $h_i$, the weighting factor is $h_i^*$ divided by a normalizing factor, a, which is $$\left(\sum_{k=1}^{K}|h_k|^2\right)^{1/2},$$

where K is the number of transmitting antennas. When more than one receiving antenna is employed, the weighting factor is $\frac{1}{a}(gH)^H$, where $g=[g_1 \ldots g_L]$, H is a matrix of channel coefficients, and a is a normalizing factor $$\left(\sum_{p=1}^{L}\sum_{q=1}^{L}\left|\sum_{k=1}^{K}h_{pk}h_{qk}^*\right|\right)^{1/2}.$$

DETAILED DESCRIPTION

Figure 1:
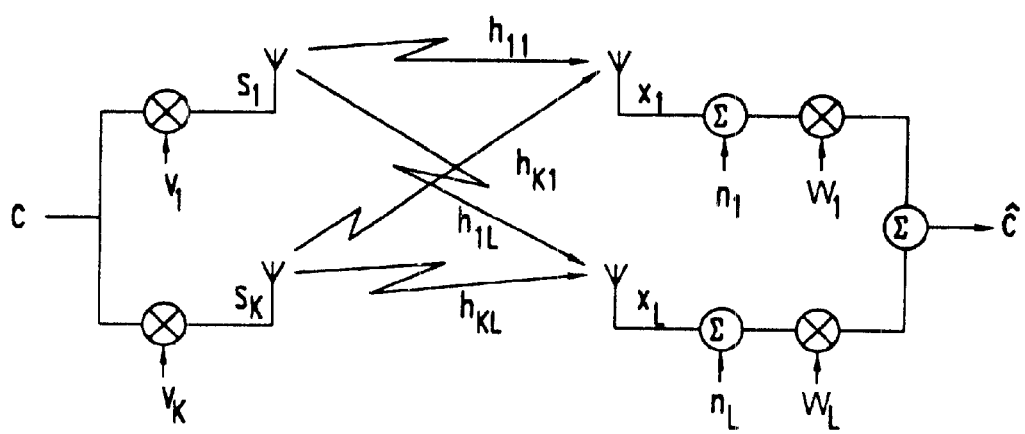
FIG. 1 illustrates an arrangement where there is both transmit and receive diversity.

FIG. 1 depicts a system which comprises K antennas for transmission and L antennas for reception. The channel between the transmit antennas and the receive antennas can be modeled by K×L statistically independent coefficients, as shown in FIG. 1. It can conveniently be represented in matrix notation by $$H = \begin{bmatrix} h_{11} & \cdots & h_{1K} \\ \vdots & \ddots & \vdots \\ h_{LJ} & \cdots & h_{LK} \end{bmatrix} = \begin{bmatrix} h_1 \\ \vdots \\ h_L \end{bmatrix} \quad (1)$$

where the entry $h_{pk}$ represents the coefficient for the channel between transmit antenna k and receiver antenna p. It is assumed that the channel coefficients are available to both the transmitter and receiver through some means, such as through a training session that employs pilot signals sent individually through each transmitting antenna. Since obtaining these coefficients is well known and does not form a part of this invention, additional exposition of the process of obtaining the coefficients is deemed not necessary.

The system model shown in FIG. 1 is a simple baseband representation. The symbol c to be transmitted is weighted with a transmit weighting vector v to form the transmitted signal vector. The received signal vector, x, is the product of the transmitted signal vector and the channel plus the noise. That is, $$x = Hs + n \quad (2)$$

where the transmitted signals s is given by $$s = [s_1 \ldots s_k]^T = c[v_1 \ldots v_k]^T, \quad (3)$$

the channel is represented by $$H = [h_1 \ldots h_k], \quad (4)$$

and the noise signal is expressed as $$n = [n_1 \ldots n_k]^T. \quad (5)$$

The received signals are weighted and summed to produce an estimate, ĉ, of the transmitted symbol c.

In accordance with the principles of this invention, the transmit weighting factor, v, is set to $$v = \frac{1}{a}[h_1 \ldots h_k]^H \quad (6)$$

where the superscript H designates the Hermitian operator, and a is a normalization factor given by $$a = \left(\sum_{k=1}^{K} |h_k|^2\right)^{1/2} \quad (7)$$

is included in the denominator when it is desired to insure that the transmitter outputs the same amount of power regardless of the number of transmitting antennas. Thus, the transmitted signal vector is $$s = cv = c/a[h_1 \ldots h_k]^H \quad (8)$$

and the signal received at one antenna is $$x = Hs + n = ac + n, \quad (9)$$

from which the symbol can be estimated with the SNR of $$\gamma = a^2 \frac{\sigma_c^2}{\sigma_n^2} = a^2 \gamma_0 \quad (10)$$

where $\gamma_0$ denotes the average SNR for the case of a single transmitting antenna (i.e., without diversity). Thus, the gain in the instantaneous SNR is $a^2$ when using multiple transmitting antennas rather than a single transmitting antenna.

The expected value of $\gamma$ is $$\bar{\gamma} = E[a^2]\gamma_0 = KE[|h_k|^2]\gamma_0 \quad (11)$$

and, hence, the SNR with a $K^{th}$-order transmitting diversity is exactly the same as that with a $K^{th}$-order receiving diversity.

When more than one receiving antenna is employed, the weighting factor, v, is $$v = \frac{1}{a}(gH)^H \quad (12)$$

where $g = [g_1 \ldots g_L]$. The transmitted signal vector is then expressed as $$s = c/a(gh)^H. \quad (13)$$

The normalization factor, a, is $|gH|$, which yields $$a = \left(\sum_{p=1}^{L} \sum_{q=1}^{L} g_p g_q^* \sum_{k=1}^{K} h_{pk} h_{qk}^*\right)^{1/2} \quad (14)$$

The received signal vector is, therefore, given by $$x = c/a H(gH)^H + n. \quad (15)$$

When the receiver's weighting factor, w, is set to be g, the estimate of the received symbol is given by $$\tilde{c} = gx = c/a gH(gh)^H + gn = ac + gn \quad (16)$$

with the overall SNR given by $$\gamma = \frac{a^2}{gg^H} \gamma_0 = \frac{a^2 \gamma_0}{\sum_{p=1}^{L} |g_p|^2}. \quad (17)$$

From equation (17), it can be observed that the overall SNR is a function of g. Thus, it is possible to maximize the SNR by choosing the appropriate values for g. Since the $h_{qk}$ terms are assumed to be statistically identical, the condition that $|g_1| = |g_2| = \ldots = |g_L|$ has to be satisfied for the maximum value of SNR. Without changing the nature of the problem, one can set $|g_p| = 1$ for simplicity. Therefore the overall SNR is $$\gamma = \frac{a^2}{L} \gamma_0 \quad (18)$$

To maximize $\gamma$ is equivalent to maximizing a, which is maximized if $$(g_p g_q^*) = \frac{\sum_{k=1}^{K} h_{pk} h_{qk}^*}{\left|\sum_{k=1}^{K} h_{pk} h_{qk}^*\right|}. \quad (19)$$

Therefore, $$a = \left(\sum_{p=1}^{L} \sum_{q=1}^{L} \left|\sum_{k=1}^{K} h_{pk} h_{qk}^*\right|\right)^{1/2} \quad (20)$$

which results in the maximum value of $\gamma$. It is clear that the gain in SNR is $$\frac{a^2}{L}$$

when multiple transmitting and receiving antennas are used, as compared to using a single antenna on the transmitting side, or the receiving side.

The vector g is determined by solving the simultaneous equations represented by equation (19). For example, if L=3, equation (19) embodies the following three equations:

$$(g_1 g_2^*) = \frac{\sum_{k=1}^{K} h_{1k} h_{2k}^*}{\left|\sum_{k=1}^{K} h_{1k} h_{3k}^*\right|}, (g_1 g_3^*) = \frac{\sum_{k=1}^{K} h_{1k} h_{3k}^*}{\left|\sum_{k=1}^{K} h_{1k} h_{3k}^*\right|}, \quad (21)$$

$$\text{and } (g_2 g_3^*) = \frac{\sum_{k=1}^{K} h_{2k} h_{3k}^*}{\left|\sum_{k=1}^{K} h_{2k} h_{3k}^*\right|},$$

All of the $h_{pg}$ coefficients are known, so the three equations form a set of three equations and three unknowns, allowing a simple derivation of the $g_1$, $g_2$, and $g_3$ coefficients. The corresponding average SNR is given by $$\bar{\gamma} = E[a^2] \frac{\gamma_0}{L} \quad (22)$$

where the value of $E[a^2]$ depends on the channel characteristics and, in general, is bounded by $$LKE[|h_k|^2] \leq E[a^2] \leq \beta L^2 KE[|h_k|^2].$$

I claim:
1. An arrangement comprising:
   K multipliers, each responsive to a symbol to be transmitted and to a distinct weighting factor $v_i$ forming a vector v; and

K transmitting antenna, where transmitting antenna i is coupled to multiplier i of said K multipliers;

where K is an integer greater than one, the weighting factor vector, v, is proportional to $v=(gH)^H$, H is a matrix of channel transfer coefficients $h_{pq}$, $p=1,2,\ldots K$, and $q=1,2,\ldots L$, subscript 4 designates the Hermitian operator, L is an integer that corresponds to the number of antennas of a receiver, and g is a vector of L components, such that $$(g_p g_q^*) = \frac{\sum_{k=1}^{K} h_{pk} h_{qk}^*}{\left|\sum_{k=1}^{K} h_{pk} h_{qk}^*\right|}.$$

2. The arrangement of claim 1 where the weighting factor vector, v, is $v=\frac{1}{a}(gH)^H$, where $$a = \left(\sum_{p=1}^{L} \sum_{q=1}^{L} \left|\sum_{k=1}^{K} h_{pk} h_{qk}^*\right|\right)^{1/2}.$$

3. The arrangement of claim 1 further comprising a receiver, which includes said L antennas for receiving signals, with antenna i of said L antennas coupled to a multiplier i that multiplies the signal of antenna i by weighting factor $w_i$, forming an L component vector w, where w=g.

4. A receiver comprising:

L receiver antennas, L being an integer greater than one,

L multipliers, each coupled to one of said L receiver antennas and multiplying a signal received from its coupled receiver antenna by a weighting factor $g_i$, $i=1,2,\ldots L$, forming a vector g such that $$(g_p g_q^*) = \frac{\sum_{k=1}^{K} h_{pk} h_{qk}^*}{\left|\sum_{k=1}^{K} h_{pk} h_{qk}^*\right|},$$

where $h_{pq}$, $p=1,2,\ldots K$, and $q=1,2,\ldots L$ is a channel transfer coefficient between a transmit antenna p and receive antenna q of said L receiver antennas.

* * * * *

UNITED STATES PATENT AND TRADEMARK OFFICE
CERTIFICATE OF CORRECTION

PATENT NO. : 6,459,740 B1
DATED : October 1, 2002
INVENTOR(S) : Titus Lo

It is certified that error appears in the above-identified patent and that said Letters Patent is hereby corrected as shown below:

<u>Title page,</u>
Item [56], References Cited, OTHER PUBLICATIONS,
"Jack J. Winters" should be -- Jack H. Winters --;

<u>Column 5,</u>
Line 6, delete "subscript 4 designates the Hermitian operator";

<u>Column 6,</u>
Line 7, "received" should be -- receiver --.

Signed and Sealed this

Thirty-first Day of January, 2006

JON W. DUDAS
*Director of the United States Patent and Trademark Office*